United States Patent
Berthelsen (10) Patent No.: US 10,059,527 B1
(45) Date of Patent: Aug. 28, 2018

(54) RAISED RECIPROCATING SLAT-TYPE CONVEYOR WITH FLOOR PAN

(71) Applicant: Hallco Industries, Inc., Tillamook, OR (US)

(72) Inventor: Timothy M. Berthelsen, Tillamook, OR (US)

(73) Assignee: HALLCO INDUSTRIES, INC., Tillamook, OR (US)

( * ) Notice: Subject to any disclaimer, the term of this patent is extended or adjusted under 35 U.S.C. 154(b) by 0 days.

(21) Appl. No.: 15/016,166

(22) Filed: Feb. 4, 2016

(51) Int. Cl.
*B65G 25/04* (2006.01)
*B65G 25/06* (2006.01)

(52) U.S. Cl.
CPC .................................. *B65G 25/065* (2013.01)

(58) Field of Classification Search
CPC .............................. B65G 25/02; B65G 25/065
USPC ........................ 198/750.2–750.6; 414/525.9
See application file for complete search history.

(56) References Cited

U.S. PATENT DOCUMENTS

| | | | |
|---|---|---|---|
| 3,534,875 | A | 10/1970 | Hallstrom et al. |
| 4,143,760 | A | 3/1979 | Hallstrom |
| 4,144,963 | A | 3/1979 | Hallstrom |
| 4,184,587 | A | 1/1980 | Hallstrom |
| 4,580,678 | A | 4/1986 | Foster |
| 4,611,708 | A | 9/1986 | Foster |
| 4,691,819 | A | 9/1987 | Hallstrom, Jr. |
| 4,727,978 | A | 3/1988 | Hallstrom, Jr. |
| 4,793,468 | A | 12/1988 | Hamilton et al. |
| 4,793,469 | A * | 12/1988 | Foster .................. B65G 25/065 198/750.5 |
| 4,856,645 | A | 8/1989 | Hallstrom, Jr. |
| 4,962,848 | A | 10/1990 | Foster |
| 5,063,981 | A | 11/1991 | Jonkka |
| 5,088,595 | A | 2/1992 | Hallstrom, Jr. |
| 5,165,525 | A | 11/1992 | Quaeck |
| 5,228,555 | A | 7/1993 | Hallstrom |
| 5,228,556 | A | 7/1993 | Quaeck |
| 5,238,360 | A | 8/1993 | Foster |
| 5,263,573 | A | 11/1993 | Hallstrom, Jr. |
| 5,267,641 | A | 12/1993 | Hallstrom, Jr. |
| 5,301,798 | A | 4/1994 | Wilkens |
| 5,323,894 | A | 6/1994 | Quaeck |
| 5,325,957 | A | 7/1994 | Wilkens |
| 5,332,081 | A | 7/1994 | Quaeck |
| 5,335,778 | A | 8/1994 | Wilkens |
| 5,346,056 | A | 9/1994 | Quaeck |
| 5,447,222 | A | 9/1995 | Foster |

(Continued)

OTHER PUBLICATIONS

Cargo Floor B.V., "Cargo Floor® Assembly Instructions," ©2006 Cargo Floor B.V., Coevorden, Holland, www.cargofloor.nl, at least as early as 2006, 110 pages.

*Primary Examiner* — William R Harp
(74) *Attorney, Agent, or Firm* — Law Office of Karen Dana Oster, LLC (57) ABSTRACT

A reciprocating slat conveyor, as described herein, includes a floor pan (having a bottom and sidewalls) for at least substantially lining the storage container. The reciprocating conveyor also includes a plurality of slat and beam assemblies (that may be bearinged or bearingless) laterally spaced and substantially parallel to each other on the bottom of the floor pan. Slat and beam assemblies may be positioned on the sidewalls. The floor pan may have an at least generally planar bottom or an at least generally arcuate bottom.

30 Claims, 11 Drawing Sheets

(56) References Cited

U.S. PATENT DOCUMENTS

| | | |
|---|---|---|
| 5,522,494 A | 6/1996 | Lutz |
| 5,547,067 A | 8/1996 | Foster |
| 5,560,472 A | 10/1996 | Gist |
| 5,664,663 A | 9/1997 | Wilkens |
| 5,727,672 A | 3/1998 | Foster |
| 6,019,568 A | 2/2000 | Bratlie |
| 6,257,396 B1 | 7/2001 | Quaeck |
| 6,513,648 B1 | 2/2003 | Hallstrom et al. |
| 6,651,806 B2 | 11/2003 | Hallstrom |
| 6,739,447 B2 | 5/2004 | Verhaeghe |
| 6,763,933 B1 | 7/2004 | Wilkens et al. |
| 6,769,532 B1 * | 8/2004 | Jonkka ............... B27B 31/003 198/750.2 |
| 6,860,695 B2 | 3/2005 | Chapman et al. |
| 7,100,972 B2 | 9/2006 | Booher |
| 7,152,729 B2 | 12/2006 | Wilkens et al. |
| 7,320,395 B2 | 1/2008 | de Baat et al. |
| 7,556,141 B2 | 7/2009 | Foster et al. |
| 7,926,646 B1 | 4/2011 | Berthelsen et al. |
| 8,074,786 B2 | 12/2011 | Wegkamp |
| 8,123,454 B2 | 2/2012 | Hallstrom |
| 8,215,478 B2 | 7/2012 | Almond |
| 8,430,231 B2 | 4/2013 | Almond |
| 8,616,365 B2 | 12/2013 | Berthelsen et al. |
| 8,827,624 B2 | 9/2014 | Hallstrom |
| 8,887,896 B1 | 11/2014 | Berthelsen et al. |
| 2003/0178546 A1 | 9/2003 | De Raad et al. |
| 2008/0277246 A1 | 11/2008 | Berthelsen |

\* cited by examiner

RAISED RECIPROCATING SLAT-TYPE CONVEYOR WITH FLOOR PAN

BACKGROUND OF INVENTION

This invention relates to reciprocating slat-type conveyor assemblies and, more specifically to raised reciprocating slat-type conveyor assemblies that include a floor pan.

Reciprocating slat-type conveyors (also referred to as "conveyor systems," "live floor conveyors," "reciprocating slat conveyors," or "conveyors") generally include a plurality of elongated slats (also referred to as "conveyor slats," "floor slats," or "deck slats"). The conveyors are generally used in the load-holding compartment of load transport vehicles (e.g. a mobile cargo trailer, bed of a truck (truck bed), rear portion of a semi-trailer, or container portion of a van-truck). The slats are arranged side-by-side to form the floor of the load-holding compartment so that they extend longitudinally to the framework of the load-holding compartment. A "load" may be, for example, grain, fertilizer, soil, sand, shredded documents, chipped wood, sawdust, garbage, or any particulate matter.

The slats are generally grouped such that one group of slats (a group generally includes at least three slats although it is to be understood that each group may include any desired number in excess of two) moves simultaneously in one direction (the "load-conveying direction") and then returns one slat at a time (in the "retraction direction") to the beginning position. This operation results in a step-wise advance of the load positioned on the floor followed by a retraction of the slats without moving the load.

Early live floor conveyors used essentially flat reciprocating slats, such as those described in U.S. Pat. Nos. 3,534,875 and 4,143,760 (which are herein incorporated-by-reference in their entirety). These flat slats rested directly on transverse frame beams and guide beams. This configuration proved problematic because friction between the slats and the beams resulted in great amounts of power lost to friction and the slats not moving smoothly on the beams. This was particularly true when the slats became wet and/or worn.

To alleviate these problems, the industry began using anti-friction bearings between the slats and the beams. This is shown in the pervasive use of bearings in live floor conveyors including, but not limited to, those shown in U.S. Pat. Nos. 4,144,963, 4,184,587, 4,611,708, 4,856,645, 5,088,595, 5,165,525, 5,263,573, 5,267,641, 5,301,798, 5,325,957, 5,335,778, 5,547,067, 5,560,472, 5,664,663, 5,727,672, 6,257,396, 6,513,648, 6,651,806, 6,763,933, and 7,152,729, and in U.S. Publication No. 2008/0277246. These references are herein incorporated-by-reference in their entirety. Many of the bearings have a structure similar to that shown in U.S. Pat. No. 4,144,963, which describes a plurality of anti-friction bearings made of synthetic, thermoplastic resin, such as TEFLON®, DELRIN®, polyethylene, or other suitable material having a low coefficient of friction. Each bearing is substantially U-shaped in cross-section, having a top wall and laterally resilient side walls to overlap the top and sides of a guide beam. Each of the side walls is provided with a pair of downwardly and inwardly extending legs such that, when in position, the legs are positioned inwardly under the opposite sides of the guide beam to secure the bearing against vertical and longitudinal displacement. Bearings, however, can be problematic for many reasons including, but not limited to, they can slip or become worn, they require a large amount of labor to install, they require relatively close tolerances for fitting between the subdeck and slats, they allow road debris such as dust and salt to become entrapped between the deck and the bearing thus increasing wear of the slats, they add weight, and they are expensive to replace.

Live floor conveyors are often used to convey particulate matter. Sometimes it is undesirable to allow the particulate matter to escape the live floor conveyor. For example, shredded confidential paper can not be allowed to escape for legal reasons. Other types of loads such as feeds and fertilizers should not be allowed to filter through the conveyors and onto the ground while the system is in the operating mode. The filtering of chicken feed, for example, to the ground attracts wild birds which in turn can bring disease to flocks of young chickens and other fowl. U.S. Pat. No. 4,727,978 (which is herein incorporated-by-reference in its entirety) is a reciprocating conveyor formed of at least one group of slats of inverted U-shape that are spaced apart laterally. The downward side sections of adjacent slats are positioned within an elongated trough into which the particulate matter is deposited. It should be noted that because the troughs do not support or guide the slats, additional structures such as tubular support members and bearing members must be used.

There are many trailers produced whose sole function is to be loaded through the open ceiling of the trailer with municipal waste, driven to a landfill, and loaded onto a tipping platform and tipped to great heights to dump the load of waste out the rear door (gate). These trailers are most often called "tipper trailers." Exemplary tipper trailers are shown and discussed in U.S. Pat. No. 6,019,568 to Bratlie, U.S. Pat. No. 6,860,695 to Chapman et al., and U.S. Pat. No. 7,100,972 to Booher. These references are herein expressly incorporated by reference in their entirety.

Liquid-tight reciprocating slat conveyors, that can be defined as leak-proof, waterproof, and/or liquid-impervious reciprocating slat conveyors are not new.

U.S. Pat. No. 4,611,708 to Foster and entitled "Reciprocating Channel Floor Conveyor" (the Foster '708 reference), U.S. Pat. No. 5,238,360 to Foster and entitled "Reciprocating Floor Conveyor with Liquid Collecting Channels Between the Floor Members" (the Foster '360 reference), and U.S. Pat. No. 5,547,067 to Foster and entitled "Reciprocating Floor Conveyor with Liquid Collecting Base Structure" (the Foster '067 reference), all describe a reciprocating slat conveyor with moving slats separated by a large gap (space) supported by full-length guide beams with bottom members that are integral parts of extruded metal shapes joined together in an interlocking manner to form a liquid-tight sub-floor. The interlock is located near the top, slat-supporting surface of a guide beam and is described as a tongue-and-groove connection. Examples of this can be seen in FIG. 10 of the Foster '708 reference, FIG. 2 of the Foster '360 reference, and FIG. 1 of the Foster '067 reference.

U.S. Pat. No. 5,088,595 to Hallstrom and entitled "Waterproof Reciprocating Conveyor" (the Hallstrom '595 reference) and U.S. Pat. No. RE 35,156 to Hallstrom and entitled "Waterproof Reciprocating Conveyor" (the Hallstrom '156 reference) describe a reciprocating slat conveyor with a slat assembly in which a plurality of elongated, imperforate slat mounting bases are arranged side-by-side on a supporting framework with adjacent longitudinal edges of adjacent bases interconnected by a liquid-tight seal, thereby forming a liquid-tight base under a plurality of elongated, longitudinally reciprocative slats mounted thereon. The liquid-tight seal means is shown located near the bottom surface of the sub-floor underneath a slat in FIGS. 3 and 4 of the Hallstrom '595 reference and FIG. 5 of the Hallstrom '156 reference.

U.S. Pat. No. 5,165,525 to Quaeck and entitled "Liquid-Tight Reciprocating Floor Construction" (the Quaeck '525 reference), U.S. Pat. No. 5,228,556 to Quaeck and entitled "Liquid-Tight Reciprocating Floor Construction" (the Quaeck '556 reference), U.S. Pat. No. 5,323,894 to Quaeck and entitled "Reciprocating Floor Construction" (the Quaeck '894 reference), and U.S. Pat. No. 5,346,056 to Quaeck and entitled "Reciprocating Floor Construction" (the Quaeck '056 reference) describe reciprocating slat conveyors that include a plurality of slats slidable on a plurality of stationary liquid-tight bases, with each base supporting an individual slat. The unitary construction of the bases prevents liquid that leaks through the points of contact of each slat and each base from reaching the floor supporting the bases. The bases are interconnected, preferably by either mating flanges or a tongue-and-groove configuration on each base. Seals adjacent the mating flanges or the tongue-and-groove configuration prevent liquid from leaking through these points of attachment to the supporting floor. This seal and joint portion is located between two slats instead of underneath a slat as shown in FIGS. 2 and 3 of the Quaeck '525 reference, the Quaeck '556 reference, and the Quaeck '894 reference as well as in FIG. 3 of the Quaeck '056 reference.

U.S. Pat. No. 6,513,648 to Hallstrom and entitled "Reciprocating Conveyor with Top Front Drive" (the Hallstrom '648 reference) describes a reciprocating slat conveyor in which the elongated slats are supported at their lateral edges on V-shaped bearings that are mounted on Y-shaped supports integral with sub-deck sections on the container bottom and joined together with watertight seals. The joint is located near the bottom of the sub-deck sections underneath a slat, as shown in FIG. 5 of the Hallstrom '648 reference.

U.S. Pat. No. 8,887,896 to Berthelsen and entitled "Liquid-Tight Reciprocating Floor Construction" (the Berthelsen reference) describes a liquid-tight reciprocating floor construction or system that includes a plurality of longitudinal sub-deck sections having at least one longitudinal guide beam and at least one longitudinal valley. A first longitudinal side edge of one longitudinal sub-deck section is preferably in a mating relationship with an adjacent second longitudinal side edge of another longitudinal sub-deck section. An internal sealing structure is preferably positioned between adjacent first and second longitudinal side edges to form a longitudinal liquid-tight sub-deck joint therebetween.

The CARGO FLOOR® leakproof floor described by Cargo Floor B.V. Coevorden of Holland in the Assembly Instructions found at www.cargofloor.nl (at least as early as 2006) includes sub-deck pieces that are assembled and joined at a joint between longitudinal side edges of adjacent longitudinal sub-deck sections. Each sub-deck section is shown as having a single valley between two raised edges. The edges are joined together so that the joints are at the top of a 10 slat-support guide beam formed by the two edges of the adjacent longitudinal sub-deck sections. A bearing and slat cover the joint at the top of a slat-support guide beam.

BRIEF SUMMARY OF THE INVENTION

This invention relates to reciprocating slat-type conveyor assemblies and, more specifically to raised reciprocating slat-type conveyor assemblies that include a floor pan.

Described herein is a reciprocating slat conveyor for use in a storage container. The reciprocating conveyor includes a floor pan (having a bottom and sidewalls) for at least substantially lining the storage container. The reciprocating conveyor also includes a plurality of slat and beam assemblies laterally spaced and substantially parallel to each other on the bottom of the floor pan. Each slat and beam assembly has at least one guide beam supporting an associated slat. Each guide beam is secured substantially parallel to the longitudinal length of the floor pan.

The sidewalls may be upward projecting sidewalls with at least one of the slat and beam assemblies positioned on one of the upward projecting sidewalls. A guide beam of each assembly is secured substantially parallel to the longitudinal length of the floor pan.

The floor pan may have an at least generally planar bottom or an at least generally arcuate bottom. If the floor pan has an at least generally planar bottom with upward projecting sidewalls, at least some of the corner edges may be radiused. If the floor pan has an at least generally arcuate bottom with upward projecting sidewalls, the arcuate bottom may be arcuate about an axis that extends away from a discharge end of the storage container.

At least one of the at least one guide beam and the slat may be made from a low friction material. The at least one guide beam may be made from a material that is dissimilar to the material from which the slat is made.

The slat and beam assemblies may include a bearing disposed between the at least one guide beam and the associated slat.

The at least one guide beam may have a body with a base section and a support section. The lower surface of the base section may be configured to mate with an upper surface of the floor pan. The upper surface of the support section may be configured to slidingly mate with a lower surface of the slat.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

The accompanying drawings, which are incorporated in and constitute a part of this specification, illustrate various exemplary embodiments.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION OF THE INVENTION

Figures 19, 20, 21:
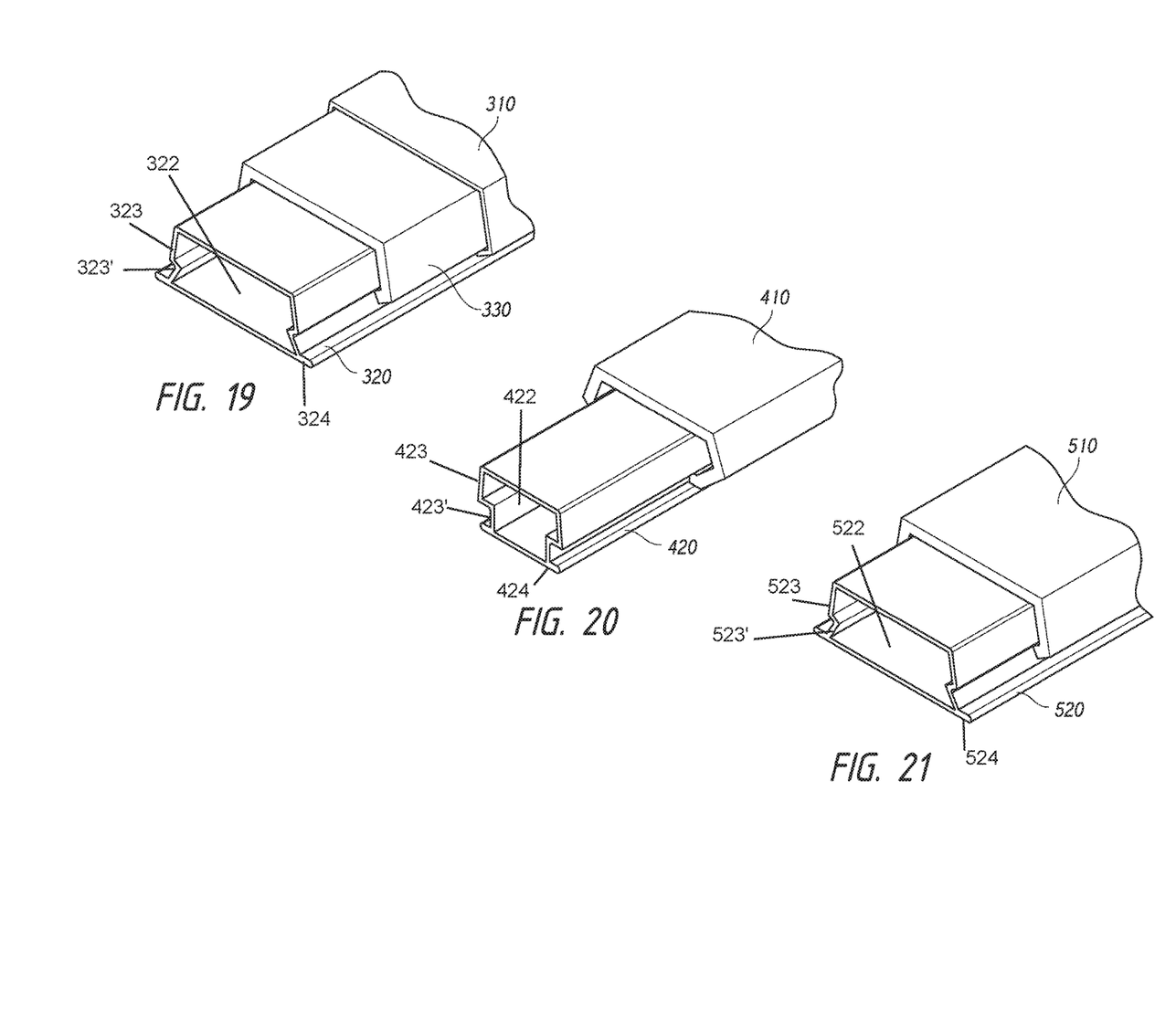
FIG. 19 is a perspective view of an alternative slat and beam assembly including a guide beam that supports an associated slat, a bearing being disposed between the guide beam and the slat.
FIG. 20 is a perspective view of an alternative bearingless slat and beam assembly including a guide beam that supports an associated slat.
FIG. 21 is a perspective view of an alternative bearingless slat and beam assembly including a guide beam that supports an associated slat.

Described herein are raised reciprocating slat-type conveyor assemblies (raised assemblies) that include a floor pan. FIGS. 1-9 are directed to raised reciprocating slat-type conveyor assemblies that include slat and beam assemblies installed on an at least generally planar floor pan. FIGS. 10-18 are directed to raised reciprocating slat-type conveyor assemblies that include slat and beam assemblies installed on an at least generally arcuate floor pan. FIGS. 19-21 show alternative slat and beam assemblies.

Exemplary raised assemblies may be better understood with reference to the drawings, but these raised assemblies are not intended to be of a limiting nature. The same reference numbers will be used throughout the drawings and description in this document to refer to the same or like parts. The shown shapes and relative dimensions are preferred, but are not meant to be limiting unless specifically claimed, in which case they may limit the scope of that particular claim.

Before describing the raised assemblies, it is important to describe some of the basic concepts of a reciprocating slat-type conveyor. Please note that the terms and phrases may have additional definitions and/or examples throughout the specification. Where otherwise not specifically defined, words and phrases are given their ordinary meaning in the art. Exemplary embodiments may be better understood with reference to the drawings, but these embodiments are not intended to be of a limiting nature. The same reference numbers will be used throughout the drawings and description in this document to refer to the same or like parts.

The phrase "storage container" is shown as the load-holding compartment of a load transport vehicle. Exemplary storage containers may include, for example, a mobile cargo trailer, a bed of a truck (truck bed), a rear portion of a semi-trailer, a cargo container, a container portion of a van-truck, stationary bins, or any mobile or stationary load holder.

The phrase "slat and beam assembly" is meant to include a slat (described below) associated with a guide beam (described below). Optionally, a slat and beam assembly may include a bearing disposed at least partially between the slat and the guide beam. Examples of slat and beam assemblies with a bearing include those shown in, for example, FIGS. 1, 9, 10, 12, 18, and 19. Examples of bearingless slat and beam assemblies are shown in, for example, FIGS. 3, 5, 12, 14, 20, and 21. These bearinged and bearingless slat and beam assemblies may be used interchangeably or for a particular purpose. It should be noted that the lower surface of a base section may be selected or modified to be appropriate with the floor pan to which it is to mate. For example, although shown in FIGS. 19-21 as having a planar lower surface of a base section, these slat and beam assemblies could be modified to have an arcuate planar lower surface if they are to be used with an arcuate floor pan.

The term "slats" (also referred to as "conveyor slats," "floor slats," or "deck slats") refers to elongated members that, together, form at least part of the reciprocating slat-type conveyors. The design of the slats, including length, width, and thickness, depends upon factors including the dimensions of the floor, the construction material, and the application(s) for which the conveyor is to be used. Reciprocating slat-type conveyors (as will be described below) generally include a plurality of elongated slats. Slats are arranged in groups of slats (a group generally includes at least three slats, although it is to be understood that each group may include any desired number in excess of two). Generally, the first slat of each group is connected to the first slat of all the other groups, the second slat of each group is connected to or synced with the second slat of all the other groups, and so on. Some slats may be fixed (unmoving).

The phrase "guide beam" is meant to describe a longitudinal member (or plurality of members) that, at least partially supports and guides an associated slat. The guide beam provides the structure upon which the slat slides. The guide beams (or the optional bearings) may be made from a low friction material that permits easy sliding of the slats in relation to the guide beams. Alternatively, the slats may be made from a low friction material that permits easy sliding of the slats in relation to the guide beams. Another alternative would be that both guide beams (or the optional bearings) and the slats may be made from a low friction material. The guide beams could be made of a material that is dissimilar to the material of the slats so that the contact between the guide beams and the slats is low friction.

The phrase "reciprocating slat-type conveyors" (also known as "conveyor systems," "live floor conveyors," "reciprocating slat conveyors," or "conveyors") generally include a plurality of elongated slats (also referred to as "conveyor slats," "floor slats," or "deck slats"). Reciprocating slat-type conveyors generally include a plurality of groups of elongated slats. Generally, all the slats of a reciprocating slat conveyor move simultaneously (in unison) in one direction (the "load-conveying direction") taking the load with them. Then one slat of each group (e.g. the first slat of each group) moves in the opposite direction (the "retraction direction") return to their starting position, followed by another slat of each group (e.g. the second slat of each group), and so on until all the slats of the groups are retracted. The stationary slats (those not currently returning) hold the load at least partially in place until the next cycle begins. This operation results in a step-wise advance (in the load-conveying direction) of particulate matter positioned on the floor that may be followed by partial retraction of the particulate matter on the floor.

The phrase "power unit" is meant to describe any source of power that may be associated with and used to move the slats of the conveyor system. An exemplary power system is a two-way, variable-speed, hydraulic power unit. The size and location of the power unit depends upon the application(s) of the conveyor system. Alternative double-sealed, bearingless, reciprocating slat-type conveyors may be powered using power units and structures shown and described in any of the references that are incorporated-by-reference herein.

The term "mate," as used herein, is used to describe a specific relationship between two components. Components that are configured to mate are shaped to work with each other. For example, if a lower surface of a base section of a guide beam is configured to mate with an upper surface of a floor pan, they may be substantially coextensive (or have portions that are substantially coextensive), with no gaps between to help create a seal therebetween. Another example is that if an upper surface of a support section of a guide beam is configured to slidingly mate with a lower surface of a slat, they may be substantially coextensive (or have portions that are substantially coextensive), with but have enough space so that the slat is able to slide in relation to the guide beam.

The term "associated" is defined to mean integral or original, retrofitted, attached, connected (including functionally connected), positioned near, and/or accessible by.

It should be noted that relative terms are meant to help in the understanding of the technology and are not meant to limit the scope of the invention. Similarly, unless specifically stated otherwise, the terms "first," "second," and "third" are meant solely for purposes of designation and not for order or limitation. It should be noted that some terms used in this specification are meant to be relative. For example, the term "top" is meant to be relative to the term "bottom." The term "front" is meant to be relative to the term "back," and the term "side" is meant to describe a "face" or "view" that connects the "front" and the "back." Another example is that the terms "longitudinal" and "transverse" are meant to be relative. Rotation of the system or component might change the terminology (e.g. "top" in relation to "bottom" or "front" in relation to "back"), but not the concept.

The terms "may," "might," "can," and "could" are used to indicate alternatives and optional features and only should be construed as a limitation if specifically included in the claims. It should be noted that the various components, features, steps, or embodiments thereof are all "preferred" whether or not it is specifically indicated. Claims not including a specific limitation should not be construed to include that limitation.

Unless specifically stated otherwise, the term "exemplary" is meant to indicate an example, representation, and/or illustration of a type. The term "exemplary" does not necessarily mean the best or most desired of the type.

It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the terms "includes," "has," and "contains" (and variations of these terms) mean "comprises" (e.g. a device that "includes," "has," or "contains" A and B, comprises A and B, but optionally may contain C or additional components other than A and B).

It should be noted that, unless otherwise specified, the singular forms "a," "an," and "the" refer to one or more than one, unless the context clearly dictates otherwise. Similarly, unless specifically limited, the use of singular language (e.g. "component," "module," or "step") may include plurals (e.g. "components," "modules," or "steps"), unless the context clearly dictates otherwise.

In addition, known patents (including many owned by applicant) may be used to provide specifics and/or variations. The following patent references (in addition to others described herein) are all incorporated by reference in their entirety: U.S. Pat. No. 8,887,896 to Berthelsen et al., U.S. Pat. No. 8,827,624 to Hallstrom, U.S. Pat. No. 8,616,365 to Berthelsen et al., U.S. Pat. No. 8,430,231 to Almond, U.S. Pat. No. 8,215,478 to Almond, U.S. Pat. No. 8,123,454 to Hallstrom, U.S. Pat. No. 7,926,646 to Berthelsen et al., U.S. Pat. No. 4,580,678 to Foster, U.S. Pat. No. 4,856,645 to Hallstrom, U.S. Pat. No. 4,962,848 to Foster, U.S. Pat. No. 3,534,875 to Hallstrom, U.S. Pat. No. 4,143,760 to Hallstrom, and U.S. Pat. No. 4,793,468 to Hamilton.

Floor Pan

The raised reciprocating slat-type conveyor assemblies (raised assemblies) described herein each includes a floor pan. The exemplary floor pan 100 shown in FIGS. 1-9 is at least generally planar. The exemplary floor pan 200 shown in FIGS. 10-18 is at least generally arcuate.

Figure 4:
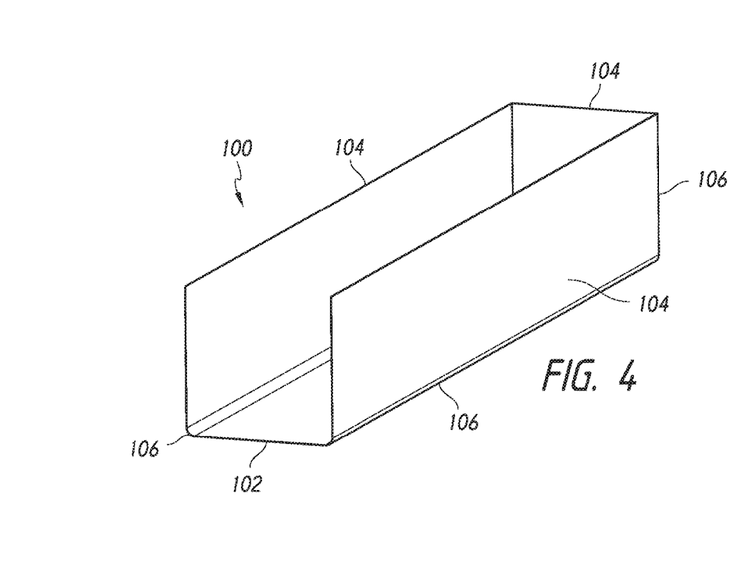
FIG. 4 is a perspective view of an exemplary at least generally planar floor pan without exemplary slat and beam assemblies.

The exemplary planar floor pan 100 shown, for example, in FIG. 4 has an at least generally planar bottom 102 with upward projecting sidewalls 104. The bottom 102 and sidewalls 104 are made from material that is liquid impervious. The corner edges 106 between the bottom 102 and sidewalls 104 may be radiused, as shown. The corner edges 106 between the sidewalls 104 may also be radiused.

Although radiusing is optional, the radius makes it easier for the load material to be cleaned out. The radius also helps to make the floor pan leakproof without having a joint in the corner (i.e. the same sheet of metal can extend from a few inches up the sidewall on one side of the storage container to a few inches up the sidewall on the other side of the storage container). The bottom 102 and sidewalls 104 may be integral or attached so as to be functionally integral. The floor pan 100 is preferably leakproof. Alternative floor pans may have slots cut therein in order to allow drive shoes to extend through the floor pan (e.g. from underneath) to drive the slats. Alternative floor pans with slots would not be liquid tight, but it would be liquid resistant.

Figure 13:
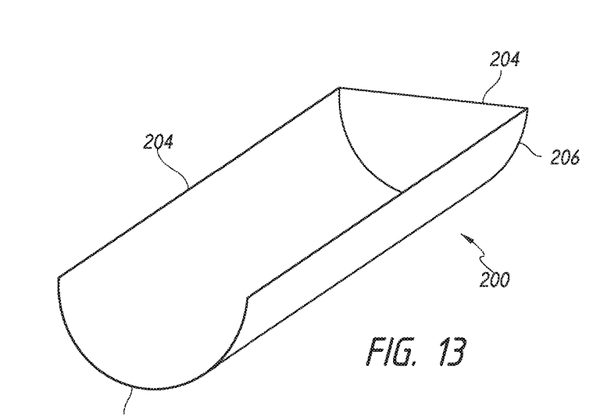
FIG. 13 is a perspective view of an exemplary at least generally arcuate floor pan without exemplary slat and beam assemblies.

The exemplary arcuate floor pan 200 shown, for example, in FIG. 13 has an at least generally arcuate bottom 202 with upward projecting sidewalls 204. The arcuate bottom 202 can be arcuate about the axis that extends away from the discharge end (parallel to the direction of conveyance). The sidewalls 204 may be the upper portions of the arcuate bottom 202 or it may be the back wall 204 as shown in FIG. 13. The bottom 202 and sidewalls 204 are made from material that is liquid impervious. Corner edges 206 between the sidewalls 204 (e.g. the upper portions of the arcuate bottom 202 and the back wall 204) may be radiused. The bottom 202 and sidewalls 204 may be integral or attached so as to be functionally integral. The floor pan 200 is preferably leakproof. Alternative floor pans may have slots cut therein in order to allow drive shoes to extend through the floor pan (e.g. from underneath) to drive the slats. Alternative floor pans with slots would not be liquid tight, but it would be liquid resistant.

Slat and Beam Assemblies

Figure 1:
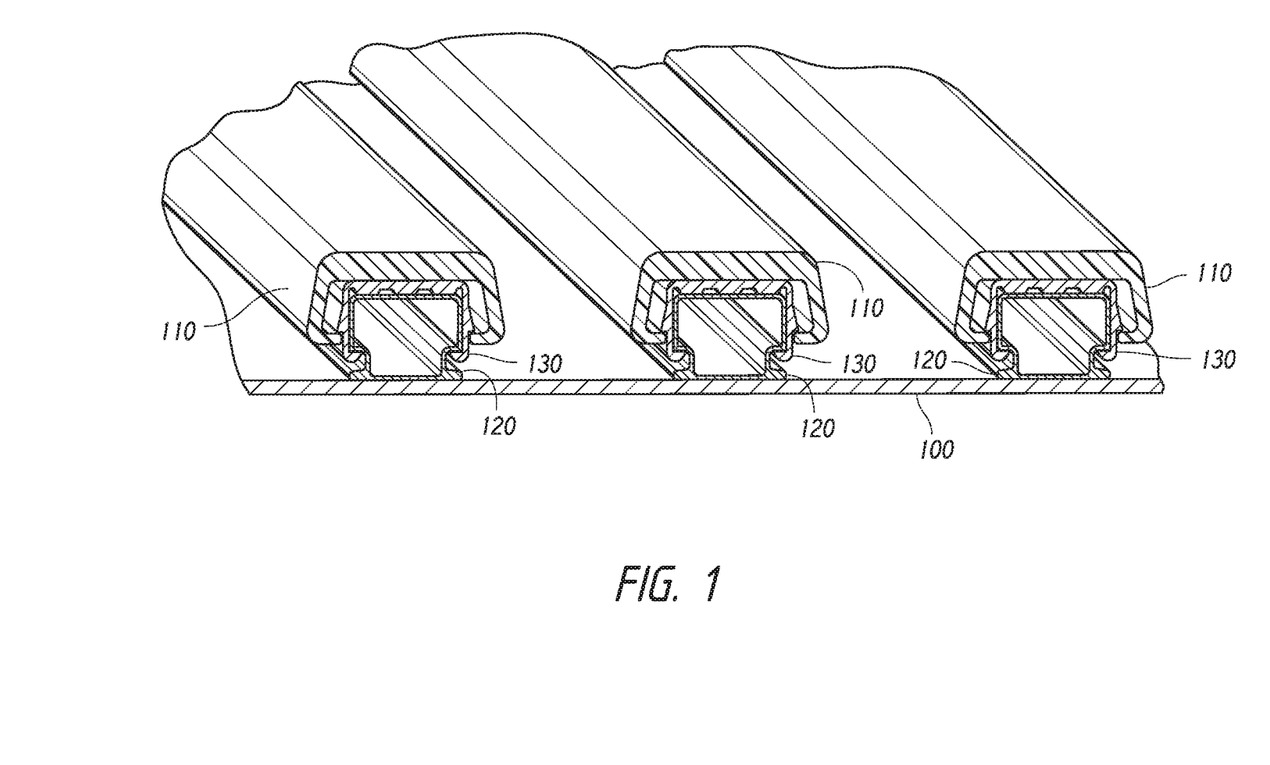
FIG. 1 is an enlarged perspective view of the ends of three exemplary slat and beam assemblies installed on an exemplary at least generally planar floor pan.
Figure 2:
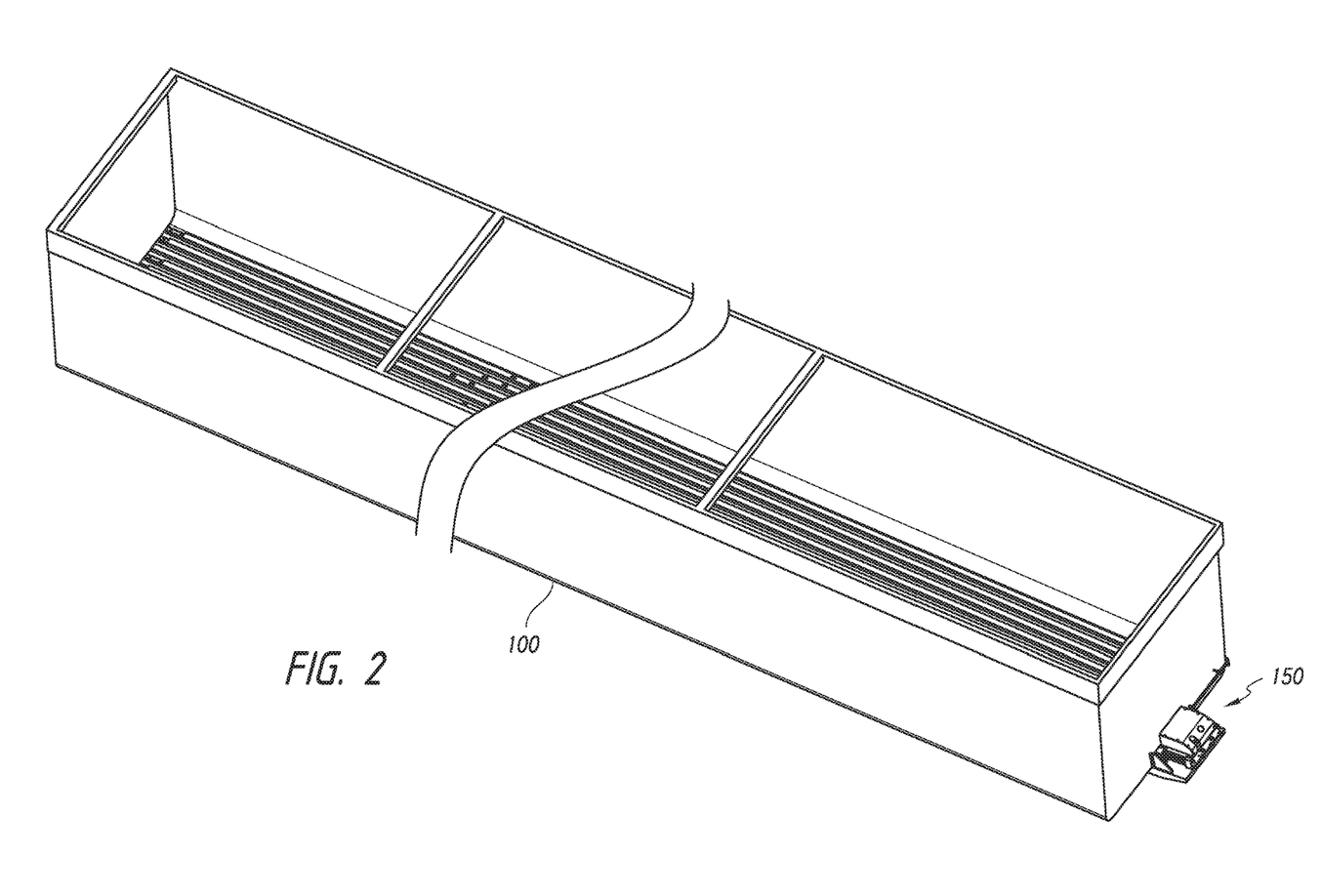
FIG. 2 is a perspective view of an exemplary at least generally planar floor pan with exemplary slat and beam assemblies installed therein.
Figure 3:
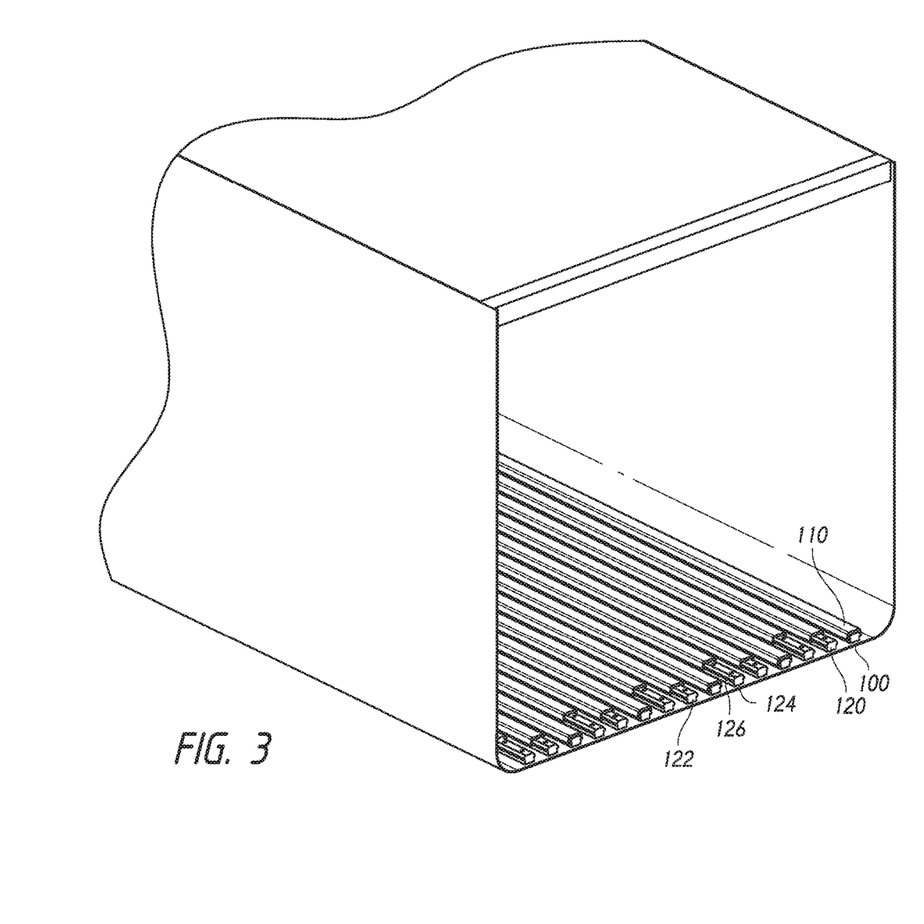
FIG. 3 is a perspective end view of the end of a storage container with an exemplary at least generally planar floor pan with exemplary bearingless slat and beam assemblies installed therein.
Figure 12:
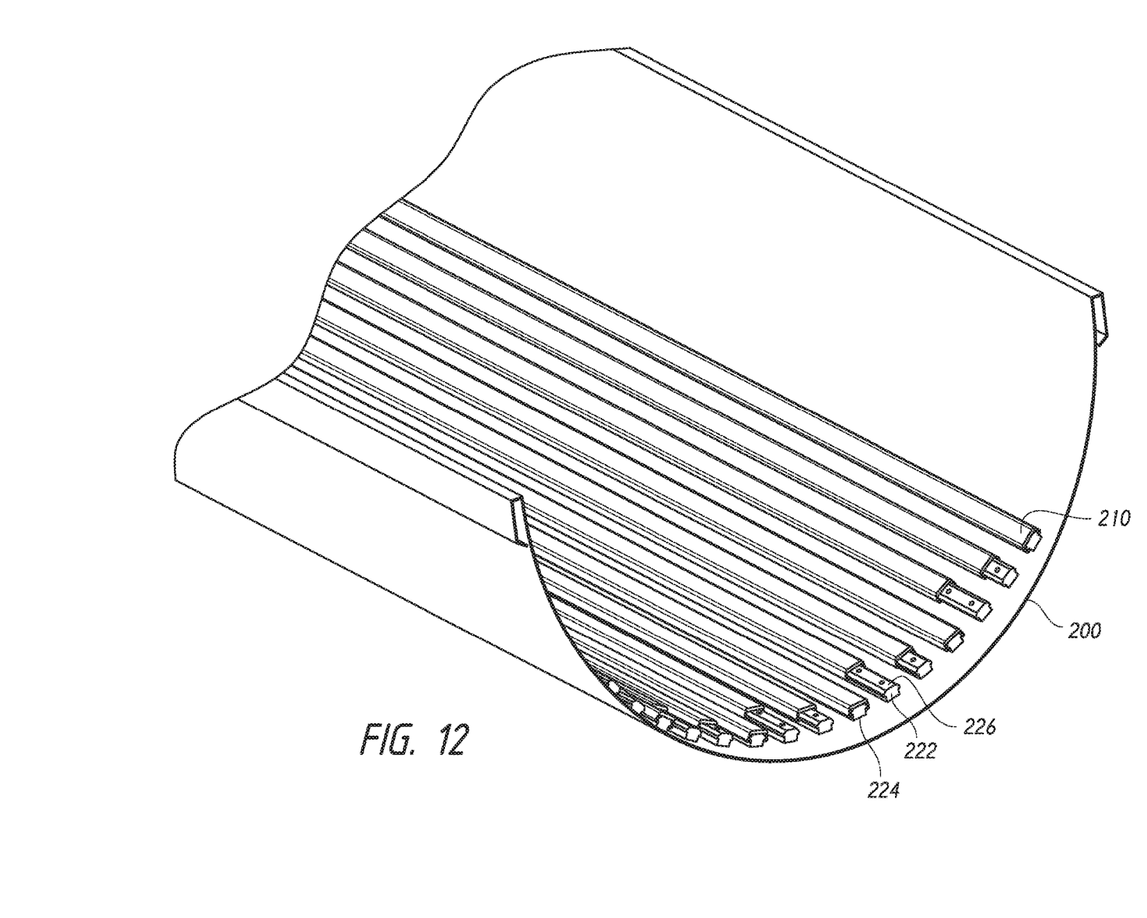
FIG. 12 is a perspective end view of the end of a storage container with an exemplary at least generally arcuate floor pan with exemplary bearingless slat and beam assemblies installed therein.

The raised assemblies described herein each includes slat and beam assemblies positioned in parallel, spaced, longitudinal relationship along at least part of the bottom 102, 202 of the floor pan 100, 200. As set forth, the phrase "slat and beam assembly" includes a slat 110, 210 associated with a guide beam 120, 220. FIGS. 3 and 12, for example, show a slat 110, 210 associated directly with a guide beam 120, 220. Optionally, a slat and beam assembly may include a bearing 130, 230 disposed at least partially between the slat 110, 210 and the guide beam 120, 220. FIGS. 1, 9, 10, and 18, for example, show a slat 110, 210 associated indirectly with a guide beam 120, 220 via a bearing 130, 230.

Figure 6:
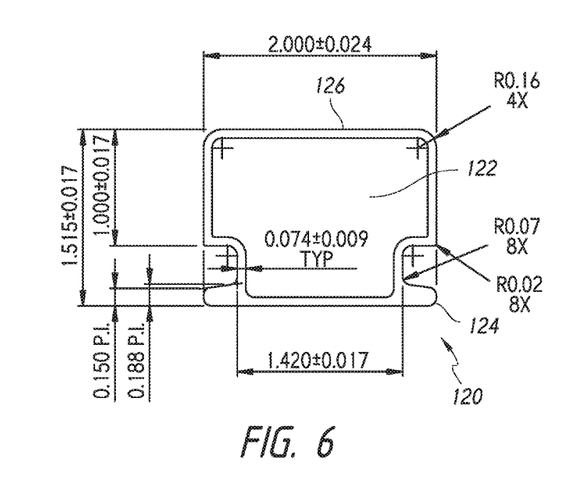
FIG. 6 is an end view of an exemplary guide beam for use with an exemplary at least generally planar floor pan.
Figure 7:
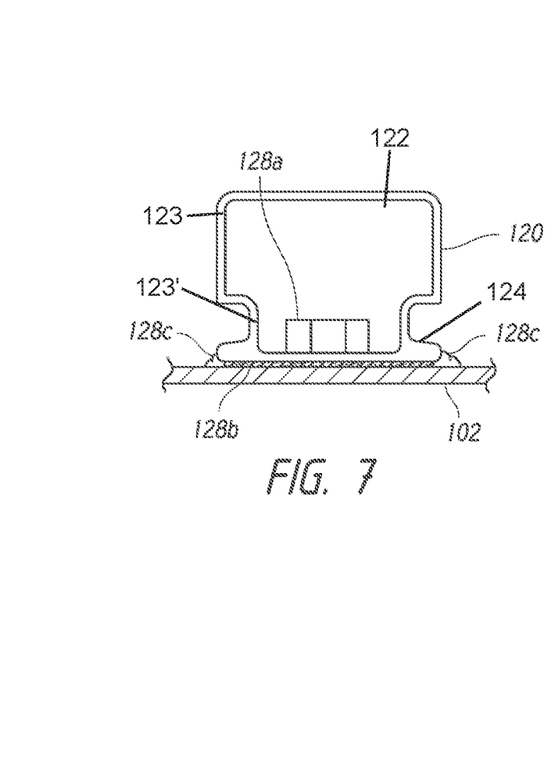
FIG. 7 is an end view of an exemplary at least generally planar floor pan with an exemplary slat and beam assembly and exemplary attachment means.
Figures 8, 9:
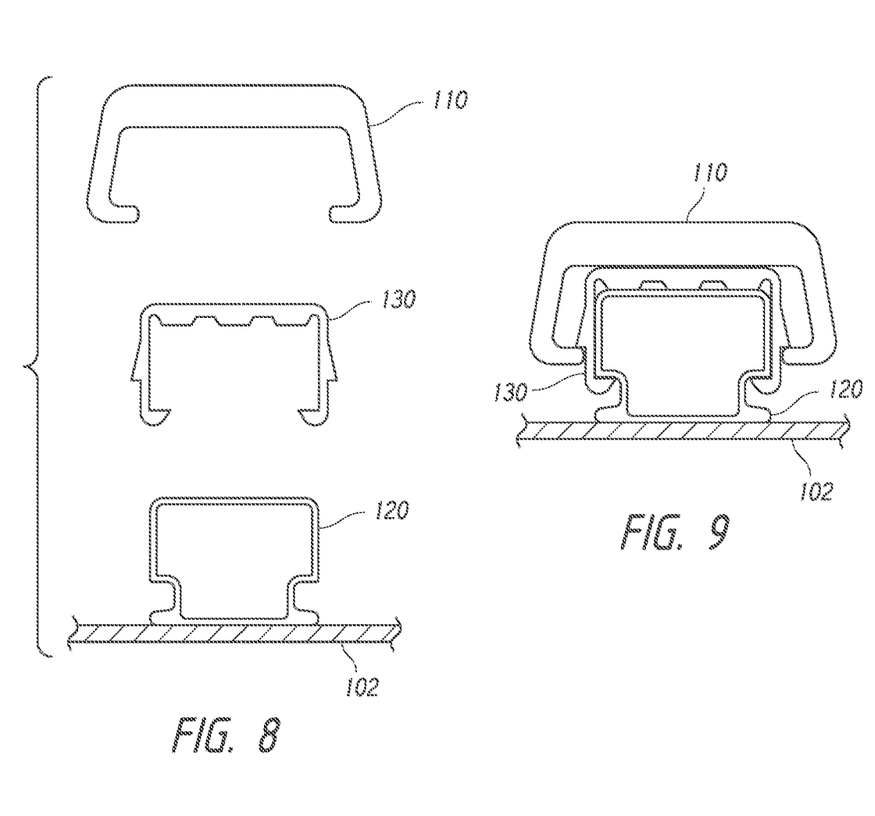
FIG. 8 is an exploded end view of an exemplary slat and beam assembly installed on an exemplary at least generally planar floor pan.
FIG. 9 is an end view of an exemplary slat and beam assembly installed on an exemplary at least generally planar floor pan.
Figure 10:
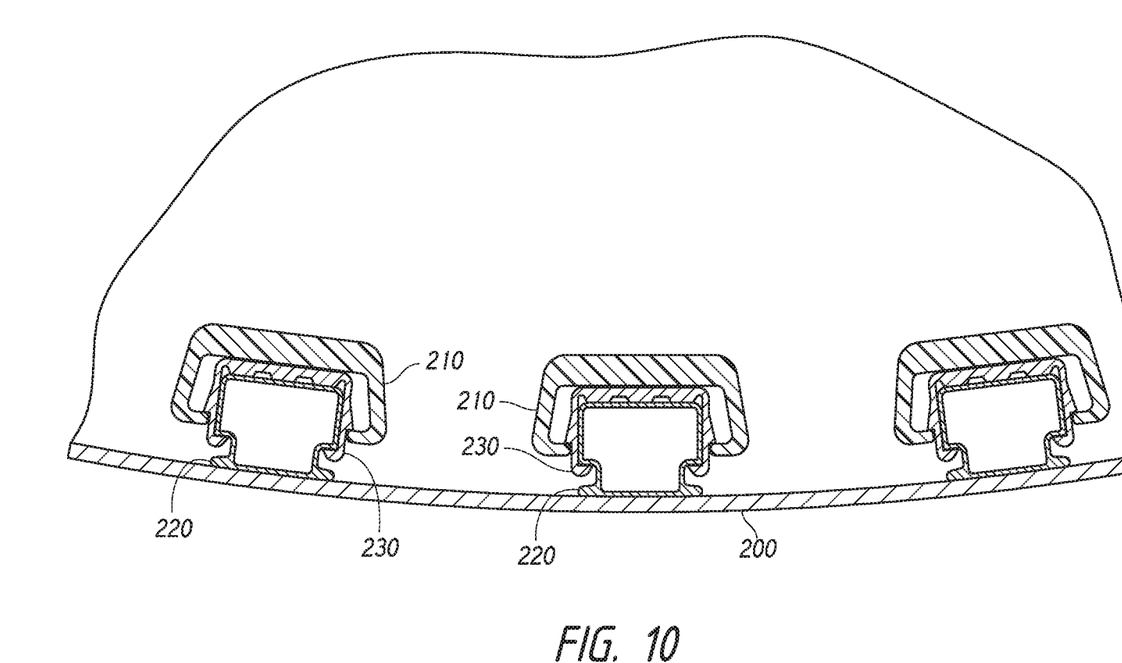
FIG. 10 is an enlarged perspective view of the ends of three exemplary slat and beam assemblies installed on an exemplary at least generally arcuate floor pan.
Figure 11:
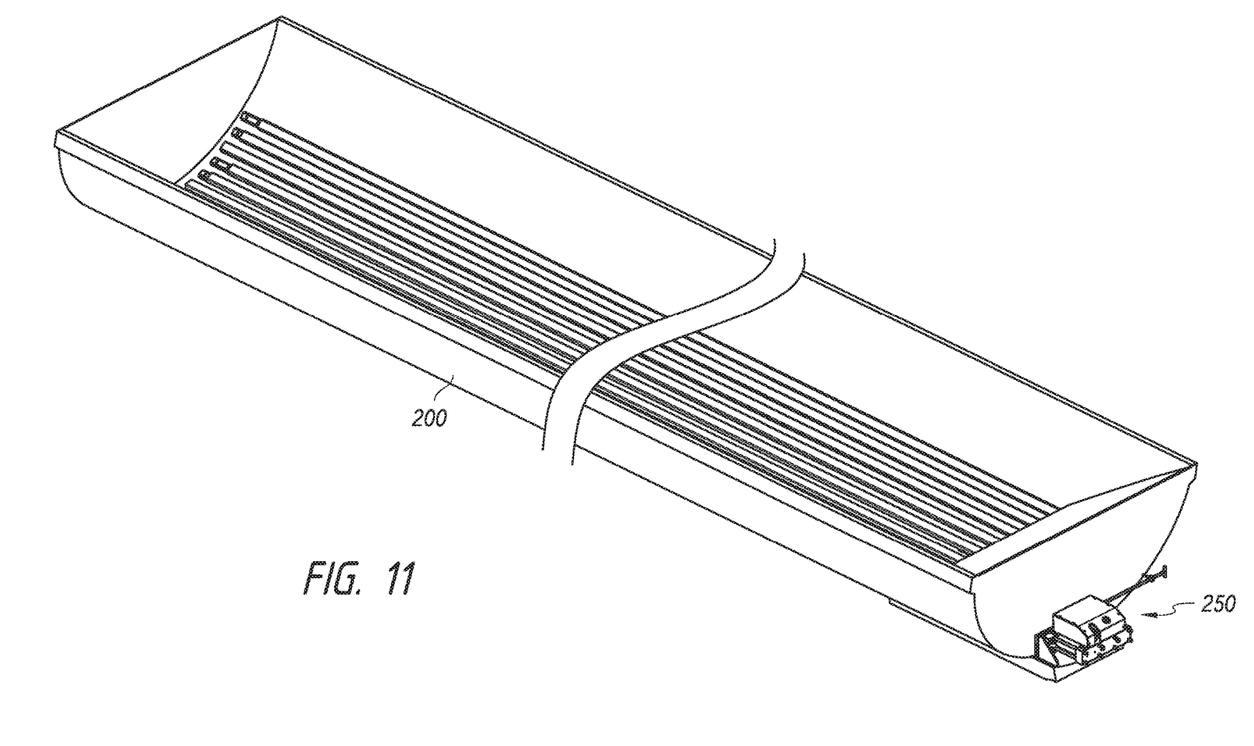
FIG. 11 is a perspective view of an exemplary at least generally arcuate floor pan with exemplary slat and beam assemblies installed therein.
Figures 17, 18:
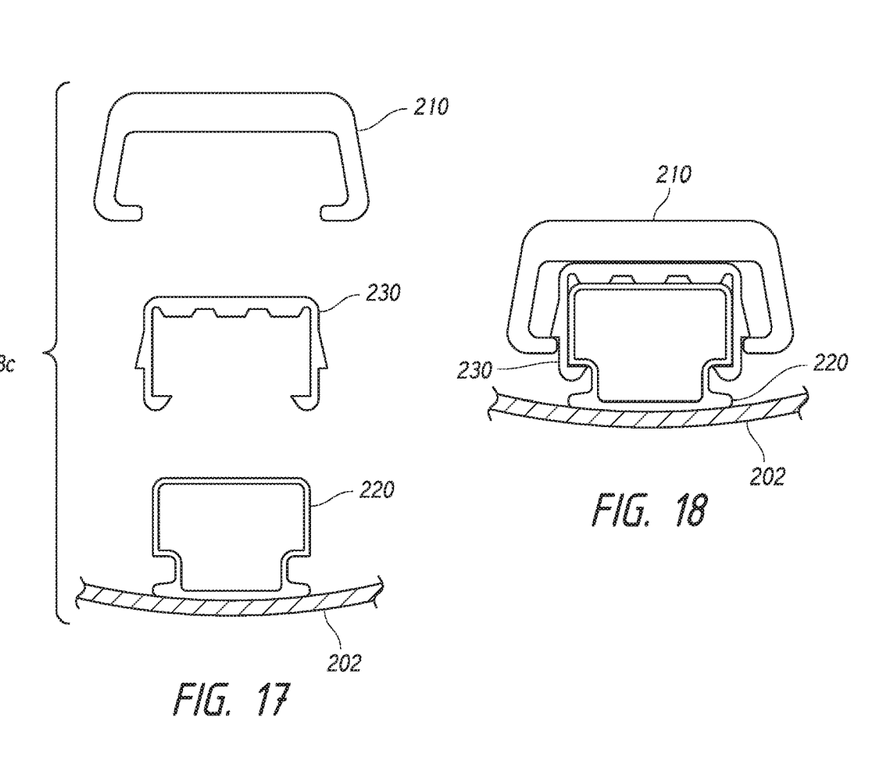
FIG. 17 is an exploded end view of an exemplary slat and beam assembly installed on an exemplary at least generally arcuate floor pan.
FIG. 18 is an end view of an exemplary slat and beam assembly installed on an exemplary at least generally arcuate floor pan.

The guide beams 120, 220 are longitudinal members (or plurality of members) that, at least partially support and guide respective slats 110, 210. If there are no bearings, the slats 110, 210 and/or guide beams may be made from a low friction material that permits easy sliding of the slats 110, 210 in relation to the guide beams 120, 220. Preferably, each guide beam 120, 220 will have a body 122, 222 with a base section 124, 224 and a support section 126, 226. The base section 124, 224 may be distinguishable from the body 122, 222 (as shown in FIGS. 6 and 17) or may be indistinguishable (the lower surface) from the body 122, 222 (as shown in FIGS. 3 and 12). The support section 126, 226 is designed to support a slat 110, 210 and, optionally a bearing 130, 230. The support section 126, 226 may be distinguishable from the body 122, 222 or may be indistinguishable (the upper surface) from the body 122, 222. Generally, the upper surface of the support section 126, 226 slidingly mates with the lower surface of the slat 110, 210. The height of the body 122, 222 should be high enough to prevent the lowest surface of the slat 110, 210 from touching the floor pan 100, 200.

The guide beams 120, 220 (and/or the bearings 130, 230) include means for preventing up and down or side to side motion of the bearings 130, 230 and/or slats 110, 210. Exemplary means for preventing this undesirable motion includes the relative shapes of the guide beams 120, 220, bearings 130, 230, and/or slats 110, 210. FIGS. 8, 9, 17, and 18 show guide beams 120, 220 with a body 122, 222 that has longitudinal side walls that a bearing 130, 230 grips (its downward projecting walls hooking into longitudinal indentations in the side walls), and the bearing 130, 230 that has longitudinal ridges that a slat 110, 210 grips (its downward projecting walls hooking into the longitudinal ridges). FIGS. 7, 16, 19, 20, and 21 show examples of guide beams 120, 220, 320, 420, 520 with longitudinal indentations 123', 223', 323', 423', 523' in the side walls 123, 223, 323, 423, 523 of the body 122, 222, 322, 422, 522. Additional means for preventing this undesirable motion is discussed in prior art incorporated by reference herein.

For bearingless slat and beam assemblies, additional information (e.g. specifics and/or variations) can be found in U.S. Pat. No. 7,926,646 to Berthelsen et al. and U.S. Pat. No. 8,616,365 to Berthelsen et al., which are incorporated by reference in their entirety.

It should be noted that the lower surface of the base of the base section 124, 224 may be coextensive (designed to mate) with the upper surface of the floor pan 100, 200. For example, the lower surface of the base section 124 may be planar tom mate with the planar upper surface of the floor pan 100. Another example is that the lower surface of the base section 224 may be arcuate tom mate with the arcuate upper surface of the floor pan 200.

Installation

The slat and beam assemblies may be installed in a floor pan 100, 200 using a variety of methods, some of the variations of which are described below. The slat and beam assemblies may be installed in the floor pan 100, 200 before or after the floor pan 100, 200 is installed in the storage container. How the slat and beam assemblies are attached to the floor pan 100, 200, however, may be effected by this installation order.

The guide beams 120, 220 are positioned so that they are laterally spaced and substantially parallel on a floor pan 100, 200. Put another way, the guide beams 120, 220 form longitudinal stripes with gaps (where particles from the load can fall down to the floor pan 100, 200) therebetween on the floor pan 100, 200.

Figure 5:
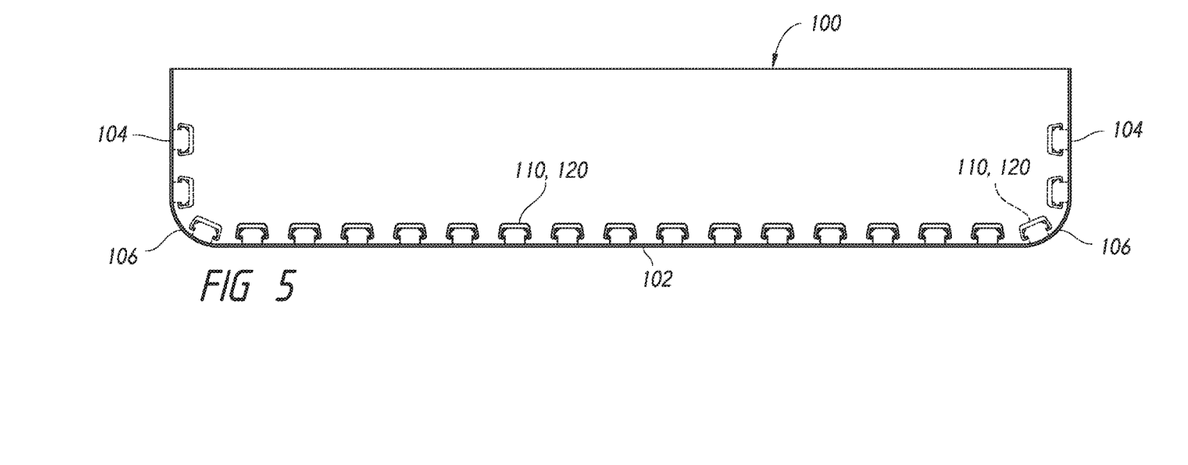
FIG. 5 is an end view of an exemplary at least generally planar floor pan with exemplary bearingless slat and beam assemblies installed therein, optional slat and beam assemblies being shown in phantom.
Figure 14:
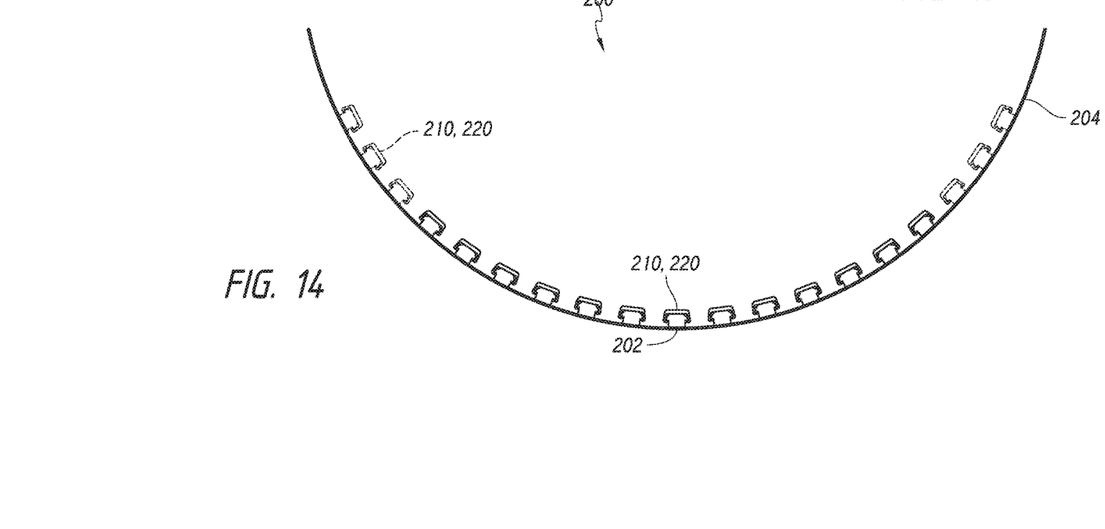
FIG. 14 is an end view of an exemplary at least generally arcuate floor pan with exemplary bearingless slat and beam assemblies installed therein, optional slat and beam assemblies being shown in phantom.
Figure 15:
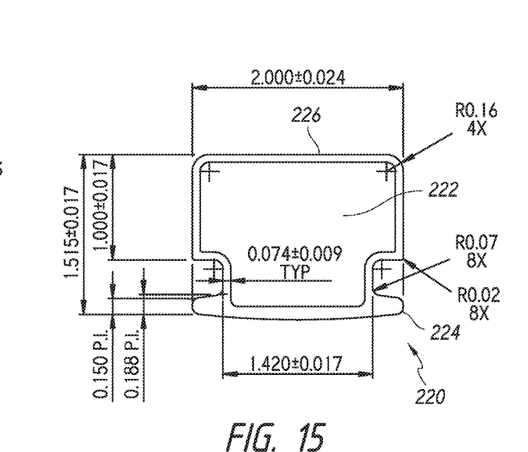
FIG. 15 is an end view of an exemplary guide beam for use with an exemplary at least generally arcuate floor pan.

The guide beams 120, 220 may be secured to the floor pan 100, 200 in any order. For example, the central guide beam 120, 220 may be installed first, then one on either side thereof. Alternatively, the guide beams 120, 220 may be installed from one side of the floor pan 100, 200 to the other. The floor pan 100, 200 may have markings, apertures, and/or structure to help with the placement. Optionally, as shown in FIGS. 5 and 14, guide beams 120, 220 may be installed at least partially up longitudinal sidewalls 104, 204 in order to improve conveyance of the load.

Figure 16:
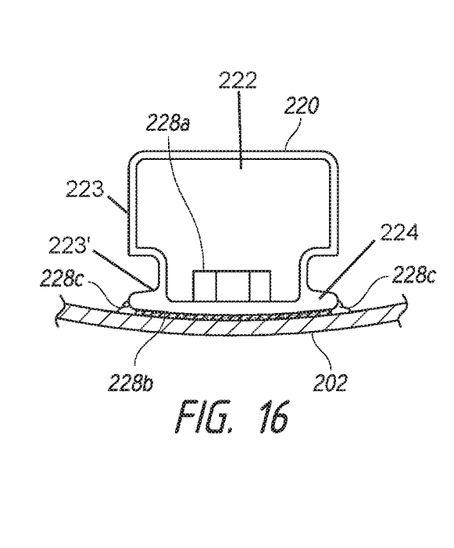
FIG. 16 is an end view of an exemplary at least generally arcuate floor pan with an exemplary slat and beam assembly and exemplary attachment means.

Once in place, each guide beam 120, 220 is secured using fastenings means that are secure and, preferably, leakproof (or at least leak resistant). For example, the guide beams 120, 220 may be used using mechanical fasteners 128a (FIG. 7), 228a (FIG. 16), adhesive 128b (FIG. 7), 228b (FIG. 16), and/or welds 128c (FIG. 7), 228c (FIG. 16). Other fastening means include, but are not limited to, particular types of mechanical fastening techniques (e.g. screwing, nailing, riveting), brazing, soldering, or any other fastening means or combination of fastening means known or yet to be discovered.

Optionally, a low friction bearing component (bearing 130, 230) may be placed on each guide beam 120, 220 to separate the guide beam 120, 220 from the moving slat 110, 210.

The slats 110, 210 are then placed on the bearings 130, 230 and/or guide beams 120, 220.

One or more power units (e.g. power unit 150 of FIG. 2 or power unit 250 of FIG. 11) may then be attached to the slats 110, 210 directly or indirectly (i.e. using cross-members). The power unit(s) is/are suitable for moving the slats 110, 210 back and forth. Exemplary power sources that are incorporated by reference include, but are not limited to, those described in U.S. Pat. No. 8,123,454 to Hallstrom, U.S. Pat. No. 8,827,624 to Hallstrom, U.S. Pat. No. 7,320,395 to De Baat, U.S. Pat. No. 6,513,648 to Hallstrom, U.S. Pat. No. 5,228,555 to Hallstrom, U.S. Pat. No. 5,088,595 to Hallstrom, U.S. Pat. No. 4,143,760 to Hallstrom, and U.S. Pat. No. 4,691,819 to Hallstrom which are incorporated herein in their entirety.

Depending on the configuration and location of the power unit(s), means for protecting the power unit(s) from the load may be used. Exemplary shielding of power sources that are incorporated by reference include, but are not limited to, those described in U.S. Pat. No. 8,123,454 to Hallstrom, U.S. Pat. No. 8,827,624 to Hallstrom, U.S. Pat. No. 6,513,648 to Hallstrom, U.S. Pat. No. 5,522,494 to Lutz, U.S. Pat. No. 5,332,081 to Lutz, which are incorporated herein in their entirety.

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not. The shown inventions, examples, and embodiments are preferred, but are not meant to be limiting unless specifically claimed, in which case they may limit the scope of that particular claim.

It is to be understood that for methods or procedures disclosed herein that include one or more steps, actions, and/or functions for achieving the described actions and results, the methods' steps, actions, and/or functions may be interchanged with one another without departing from the scope of the present invention. In other words, unless a specific order of steps, actions, and/or functions is required for proper or operative operation of the methods or procedures, the order and/or use of specific steps, actions, and/or functions may be modified without departing from the scope of the present invention.

All references cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A reciprocating slat conveyor for use in a storage container, said reciprocating slat conveyor comprising:
    (a) a floor pan for at least substantially lining said storage container, said floor pan having a bottom and sidewalls, said floor pan having a longitudinal length;
    (b) a plurality of slat and beam assemblies laterally spaced and substantially parallel to each other on said bottom of said floor pan, each slat and beam assembly having at least one guide beam supporting an associated slat;
    (c) each guide beam having longitudinal indentations along longitudinal side walls of said guide beam, each guide beam being secured substantially parallel to said longitudinal length of said floor pan; and
    (d) said at least one guide beam having a body with a base section and a support section, said base section having a base section maximum width and said support section having a support section maximum width, said base section maximum width and said support section maximum width being substantially the same.

2. The reciprocating slat conveyor of claim 1, said sidewalls being upward projecting sidewalls, at least one of said slat and beam assemblies positioned on one of said upward projecting sidewalls, a guide beam of the at least one assembly on the upward projecting sidewall secured substantially parallel to said longitudinal length of said floor pan.

3. The reciprocating slat conveyor of claim 1, said floor pan having an at least generally planar bottom with upward projecting sidewalls.

4. The reciprocating slat conveyor of claim 1, said floor pan having an at least generally planar bottom with upward projecting sidewalls, at least some of the corner edges being radiused.

5. The reciprocating slat conveyor of claim 1, said floor pan having an at least generally arcuate bottom with upward projecting sidewalls.

6. The reciprocating slat conveyor of claim 1, said floor pan having an at least generally arcuate bottom with upward projecting sidewalls, said arcuate bottom being arcuate about an axis that extends away from a discharge end of said storage container.

7. The reciprocating slat conveyor of claim 1, wherein at least one of said at least one guide beam and said slat is made from a low friction material.

8. The reciprocating slat conveyor of claim 1, said at least one guide beam being made from a material that is dissimilar to the material from which said associated slat is made.

9. The reciprocating slat conveyor of claim 1, said slat and beam assemblies further comprising a bearing disposed between said at least one guide beam and said associated slat.

10. The reciprocating slat conveyor of claim 1, said at least one guide beam having a body with a base section and a support section, a lower surface of said base section configured to mate with an upper surface of said floor pan, an upper surface of said support section configured to slidingly mate with a lower surface of said slat.

11. The reciprocating slat conveyor of claim 1, said base section being distinguishable from said support section.

12. The reciprocating slat conveyor of claim 1, the width of the majority of the support section being the support section maximum width.

13. The reciprocating slat conveyor of claim 1, said base section being distinguishable from said support section, the width of the majority of the support section being the support section maximum width.

14. The reciprocating slat conveyor of claim 1, wherein a significant longitudinal gap is formed between laterally spaced adjacent slat and beam assemblies, each said longitudinal gap exposing said floor pan.

15. A reciprocating slat conveyor for use in a storage container, said reciprocating slat conveyor comprising:
   (a) a floor pan for at least substantially lining said storage container, said floor pan having a bottom and sidewalls, said floor pan having a longitudinal length;
   (b) a plurality of slat and beam assemblies laterally spaced and substantially parallel to each other, each slat and beam assembly having at least one guide beam supporting an associated slat, each at least one guide beam being secured substantially parallel to said longitudinal length of said floor pan;
   (c) said at least one guide beam having a body with a base section and a support section, each guide beam having longitudinal indentations along longitudinal side walls of said guide beam, a lower surface of said base section configured to mate with an upper surface of said floor pan, an upper surface of said support section configured to slidingly mate with a lower surface of said slat; and
   (d) said base section having a base section maximum width and said support section having a support section maximum width, said base section maximum width and said support section maximum width being substantially the same.

16. The reciprocating slat conveyor of claim 15, said sidewalls being upward projecting sidewalls, at least one of said slat and beam assemblies positioned on one of said upward projecting sidewalls, a guide beam of the at least one assembly on the upward projecting sidewall secured substantially parallel to said longitudinal length of said floor pan.

17. The reciprocating slat conveyor of claim 15, said floor pan having an at least generally planar bottom with upward projecting sidewalls.

18. The reciprocating slat conveyor of claim 15, said floor pan having an at least generally planar bottom with upward projecting sidewalls, at least some of the corner edges being radiused.

19. The reciprocating slat conveyor of claim 15, said floor pan having an at least generally arcuate bottom with upward projecting sidewalls.

20. The reciprocating slat conveyor of claim 15, said floor pan having an at least generally arcuate bottom with upward projecting sidewalls, said arcuate bottom being arcuate about an axis that extends away from a discharge end of said storage container.

21. The reciprocating slat conveyor of claim 15, wherein at least one of said at least one guide beam and said slat is made from a low friction material.

22. The reciprocating slat conveyor of claim 15, said at least one guide beam being made from a material that is dissimilar to the material from which said associated slat is made.

23. The reciprocating slat conveyor of claim 15, said slat and beam assemblies further comprising a bearing disposed between said at least one guide beam and said associated slat.

24. The reciprocating slat conveyor of claim 15, said base section being distinguishable from said support section.

25. The reciprocating slat conveyor of claim 15, the width of the majority of the support section being the support section maximum width.

26. The reciprocating slat conveyor of claim 15, said base section being distinguishable from said support section.

27. The reciprocating slat conveyor of claim 15, wherein a significant longitudinal gap is formed between laterally spaced adjacent slat and beam assemblies, each said longitudinal gap exposing said floor pan.

28. A guide beam for use in a reciprocating slat conveyor for use in a storage container, said guide beam comprising:
   (a) a body with a base section and a support section, said base section having a base section maximum width and said support section having a support section maximum width, said base section maximum width and said support section maximum width being substantially the same;
   (b) longitudinal side walls; and
   (c) longitudinal indentations along said longitudinal side walls, longitudinal indentations between said base section and said support section.

29. The guide beam of claim 28, said base section being distinguishable from said support section.

30. The guide beam of claim 28, the width of the majority of the support section being the support section maximum width.

* * * * *